US011262583B2

(12) United States Patent
Greenwood et al.

(10) Patent No.: US 11,262,583 B2
(45) Date of Patent: Mar. 1, 2022

(54) COORDINATION OF WATER-RELATED EXPERIENCES WITH VIRTUAL REALITY CONTENT

(71) Applicant: Ballast Technologies, Inc., San Francisco, CA (US)

(72) Inventors: Stephen Greenwood, San Francisco, CA (US); Ananda Shah, San Francisco, CA (US); Alkis Roufas, San Francisco, CA (US); Allan Evans, George Town (KY)

(73) Assignee: Ballast Technologies, Inc., San Francisco, CA (US)

( * ) Notice: Subject to any disclaimer, the term of this patent is extended or adjusted under 35 U.S.C. 154(b) by 0 days.

(21) Appl. No.: 17/026,247

(22) Filed: Sep. 20, 2020

(65) Prior Publication Data
US 2021/0003844 A1  Jan. 7, 2021

Related U.S. Application Data

(63) Continuation of application No. 16/350,092, filed on Sep. 24, 2018, now Pat. No. 10,782,525.
(Continued)

(51) Int. Cl.
*G02B 27/01* (2006.01)
*B63C 11/16* (2006.01)
(Continued)

(52) U.S. Cl.
CPC ............. *G02B 27/017* (2013.01); *A63G 3/00* (2013.01); *A63G 21/18* (2013.01); *A63G 31/16* (2013.01);
(Continued)

(58) Field of Classification Search
CPC ...... G02B 27/017; G06N 20/00; A63G 21/18; B63C 11/16; G06T 19/006; H04L 67/38
See application file for complete search history.

(56) References Cited

U.S. PATENT DOCUMENTS 9,224,100 B1 * 12/2015 Chatterjee .......... G06Q 30/0267
9,740,010 B2    8/2017 Alhashim
(Continued)

FOREIGN PATENT DOCUMENTS

WO    2017153532 A1    9/2017

OTHER PUBLICATIONS

International Search Report from PCT Application No. PCT/US18/00374 (filed Sep. 24, 2018), dated Feb. 4, 2019.
(Continued)

*Primary Examiner* — Alexander Eisen
*Assistant Examiner* — Cory A Almeida

(57) ABSTRACT

Disclosed herein are systems for providing virtual reality or mixed reality experiences to riders of a waterslide. In some embodiments, the system comprises a plurality of beacons or markers disposed along the waterslide, and a waterproof virtual reality (VR) headset for presenting virtual reality or mixed reality content to a person wearing the waterproof VR headset and riding the waterslide, wherein each of the plurality of beacons or markers is configured to be detectable to facilitate coordinated presentation of the virtual reality or mixed reality content to the person wearing the waterproof VR headset and riding the waterslide based at least in part on a location of the person along the waterslide.

23 Claims, 13 Drawing Sheets

Related U.S. Application Data

(60) Provisional application No. 62/606,492, filed on Sep. 25, 2017.

(51) Int. Cl.

| | | |
|---|---|---|
| *A63G 21/18* | (2006.01) | |
| *G06T 19/00* | (2011.01) | |
| *H04L 67/131* | (2022.01) | |
| *G06N 20/00* | (2019.01) | |
| *A63G 3/00* | (2006.01) | |
| *H04W 4/02* | (2018.01) | |
| *A63G 31/16* | (2006.01) | |
| *H04W 4/30* | (2018.01) | |
| *B63C 11/12* | (2006.01) | |

(52) U.S. Cl.
CPC .......... *B63C 11/16* (2013.01); *G02B 27/0176* (2013.01); *G06N 20/00* (2019.01); *G06T 19/006* (2013.01); *H04L 67/38* (2013.01); *H04W 4/026* (2013.01); *H04W 4/027* (2013.01); *H04W 4/30* (2018.02); *B63C 2011/121* (2013.01); *G02B 2027/014* (2013.01)

(56) References Cited

U.S. PATENT DOCUMENTS

| | | |
|---|---|---|
| 2004/0086838 A1 | 5/2004 | Dinis |
| 2006/0252563 A1* | 11/2006 | Werner .................. A63G 21/18 |
| | | 472/117 |
| 2014/0098215 A1 | 4/2014 | Dinis et al. |
| 2015/0321606 A1 | 11/2015 | Vartanian et al. |
| 2016/0005232 A1* | 1/2016 | Quarles .................... G06F 3/16 |
| | | 345/633 |
| 2017/0030349 A1 | 2/2017 | Bassett et al. |
| 2017/0164321 A1* | 6/2017 | Qiu ........................... G01S 5/18 |
| 2019/0004598 A1* | 1/2019 | Gordt ..................... G06F 3/011 |

OTHER PUBLICATIONS

J. Durbin, "We Tried an Underwater VR Headset, and it Worked," UploadVR, Feb. 8, 2017 (available at https://uploadvr.com/tried-vr-headset-underwater-worked/).
R. Metz, "Using Virtual Reality Underwater Is Weird (but Fun)," MIT Technology Review, Feb. 20, 2017 (available at https://www.technologyreview.com/s/603634/using-virtual-reality-underwater-is-weird-but-fun/).
TheoryCrackers VR, "Does VR work Underwater?," Feb. 7, 2017, YouTube video available at https://www.youtube.com/watch?v=juaJHvK6ZVA&feature=youtu.be.
Written Opinion of the International Search Authority from PCT Application No. PCT/US18/00374 (filed Sep. 24, 2018), dated Feb. 4, 2019.

* cited by examiner

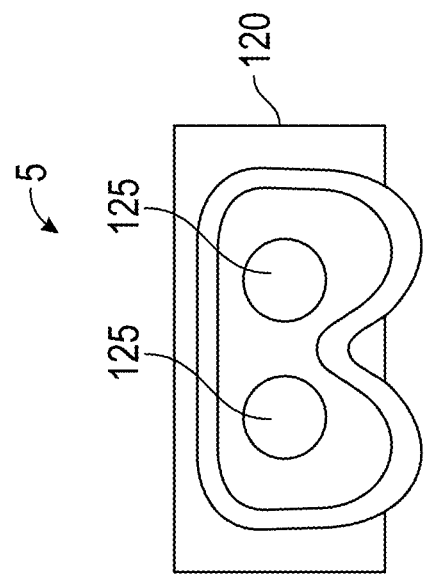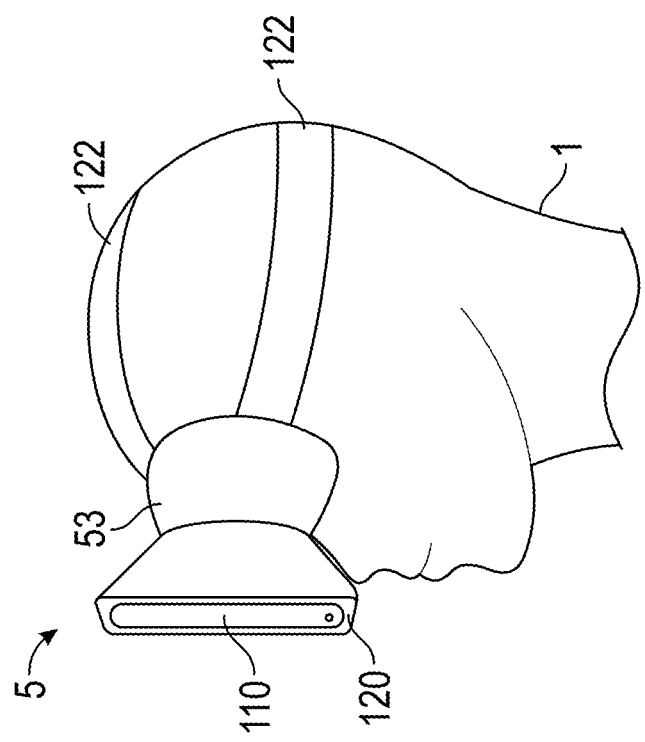
FIG. 3

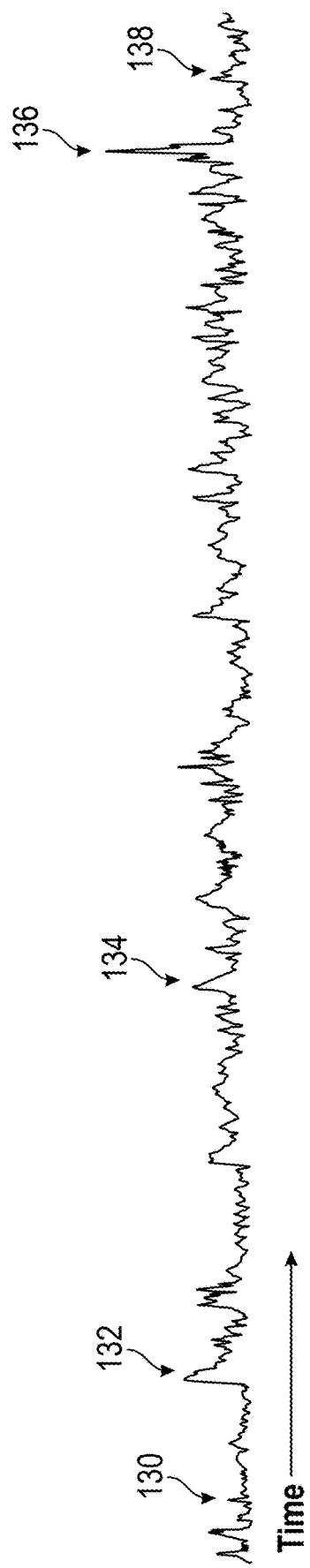

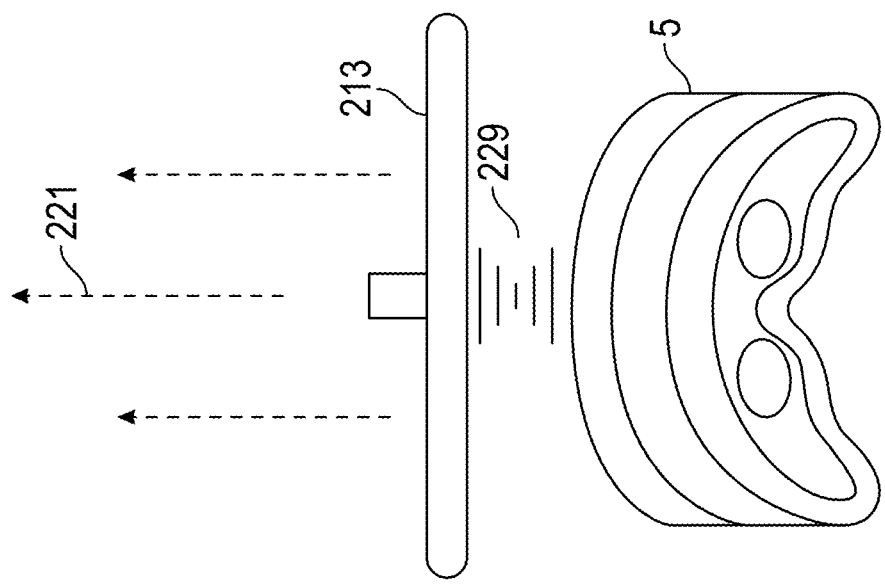
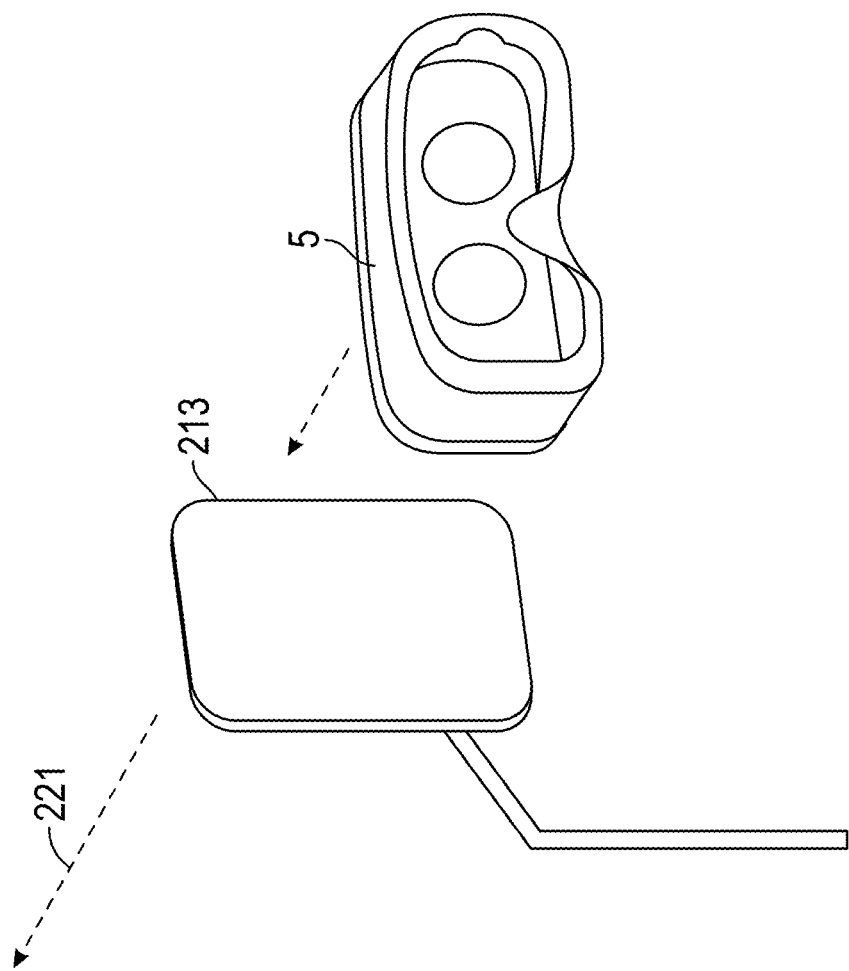
FIG. 11

COORDINATION OF WATER-RELATED EXPERIENCES WITH VIRTUAL REALITY CONTENT

CROSS-REFERENCE TO RELATED APPLICATIONS

This application claims the benefit of, and hereby incorporates by reference in its entirety for all purposes, U.S. patent application Ser. No. 16/350,092, filed Sep. 24, 2018 and entitled "COORDINATION OF WATER-RELATED EXPERIENCES WITH VIRTUAL REALITY CONTENT." U.S. patent application Ser. No. 16/350,092 claims the benefit of U.S. Provisional Application No. 62/606,492, filed Sep. 25, 2017, which is also incorporated by reference herein in its entirety.

FIELD

The present invention is directed to devices, systems and methods for coordinating water-related experiences with virtual reality content.

BACKGROUND

There has been a report of a virtual reality system that could potentially be used by an individual in water. U.S. Pat. No. 9,740,010, entitled "Waterproof Virtual Reality Goggle and Sensor System," for example, allegedly reports the following: "A waterproof 3D virtual reality system is described. The virtual reality system includes several key components, such as a submersion tank, an enveloping medium, a waterproof head-mounted display system containing a sensor for tracking the user's head movements and an optical element that displays virtual reality images, waterproof hand sensors, electronic surface sensors, a computer/controller that both receives and transmits location and speed data from sensors worn by the user, and a computer-implemented virtual reality video input signal that is dynamically modified in accordance with movement of the user's head and/or hand sensors. Furthermore, a method of enhancing a user's overall virtual experience is described. This method involves the user occupying a position of partial submersion in a body of fluid, such that the fluid provides buoyancy and resistance to the user."

Despite this report there is still a need in the art for novel devices, systems and methods for coordinating water-related experiences with virtual reality content.

SUMMARY

In one aspect of the present invention, a method of providing a virtual reality experience to a rider moving along the surface of water is provided. The method includes the following steps: providing a headset to the rider, wherein the headset is placed over the rider's eyes; providing a surface of water along which the rider can travel; collecting data on the rider's acceleration, velocity or orientation through interaction of the headset with signals generated next to the surface of the water along which the rider travels; using the data to calculate one or more values that are used to coordinate virtual reality content with the rider's position along the water surface; presenting the virtual reality content to the rider through the headset, thereby providing a virtual reality experience to the rider.

In another aspect of the present invention, a headset for providing virtual reality content to a user is provided. The headset includes: a viewing unit attached to a dive mask, wherein the dive mask comprises lenses and lens frames that hold a glass plate, and wherein the viewing unit includes a smartphone or tablet placed in a protective housing or enclosure, and wherein there is an empty space between the viewing unit and the dive mask glass, and wherein the empty space fills with water when the headset is submerged in water, and wherein the combination of headset lenses and the water that fills the empty space between the viewing unit and dive mask glass coordinate to provide sharper images for the user.

In another aspect of the present invention, a method of providing a virtual reality experience to a person in a confined body of water is provided. The method includes the steps of: providing a headset to the person, wherein the headset is placed over the person's eyes; providing a confined body of water, wherein beacons or markers are placed with respect to the confined body of water such that signals can be sent from the beacons or markers to a receiver on the headset; collecting data based on the interaction between the beacons or markers and the headset, wherein the data is used to coordinate virtual content with the person's position within the confined body of water, thereby providing a virtual reality experience to the person.

BRIEF DESCRIPTION OF THE DRAWINGS

FIG. 3 is a side and rear view of a mixed reality headset designed for use in water.

FIG. 6. shows the "acceleration signature" of the user's physical motion during the experience.

FIG. 11 is an isometric and top view of a mixed reality headset using NFC technology to initiate the mixed reality experience and orient the forward direction of the experience.

DETAILED DESCRIPTION

Figure 1:
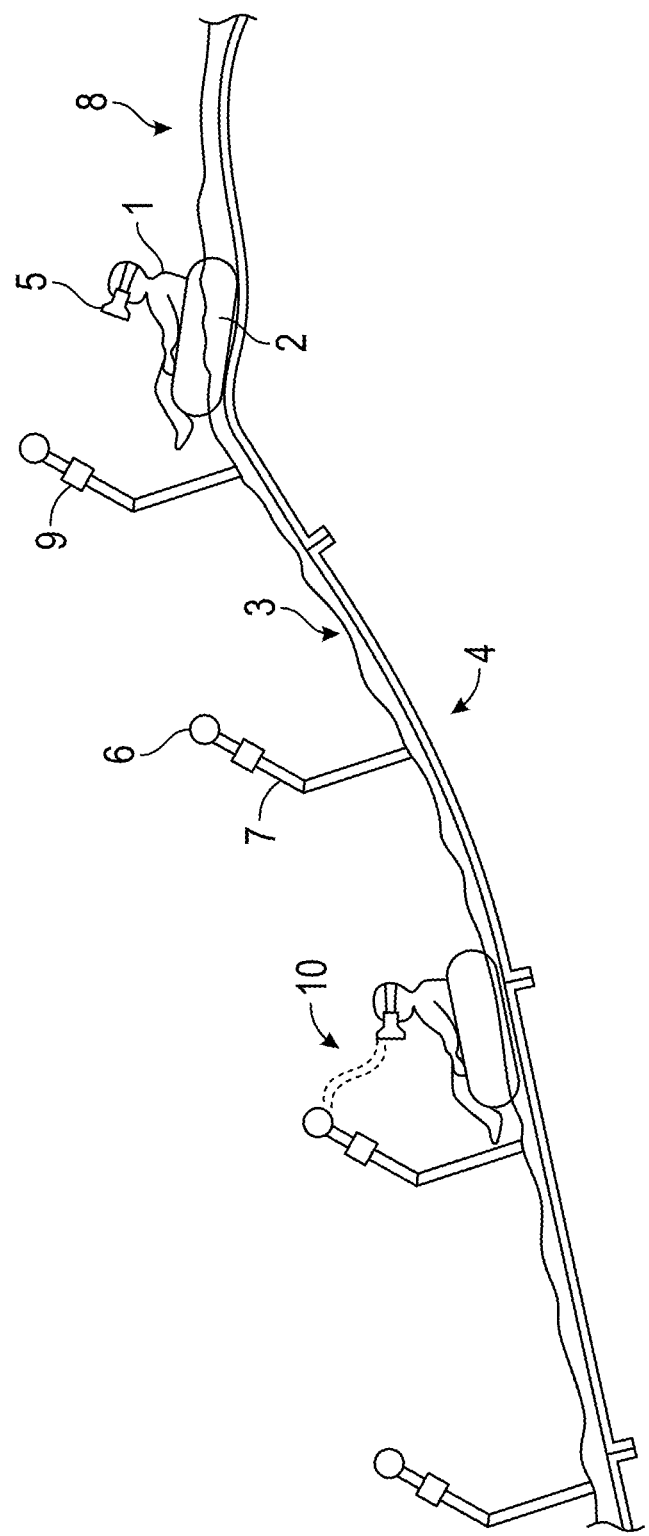
FIG. 1 is a side view of a water slide with the beacon system installed.

As used herein, "mixed reality content" refers to imagery, sounds and other sensations displayed by a headset worn over the eyes and potentially using other devices for sensory stimulation to simulate a user's physical presence in a digitally created environment that takes place in a physical environment where real objects are also incorporated into the virtual experience.

"Synchronized" refers to the act of causing two things to occur at the same time, so that the perspective of the user in the virtual environment matches that of their position in the physical world.

"User's movements" include, but are not limited to, any physical motion that a person generates during a virtual reality experience.

"Fusion algorithm" refers to mathematical code that combines inputs from multiple sensors to conclude a final outcome, in this case a user's ultimate position.

"Acceleration signature" refers to the recording and output of a pattern of inertial physical movements by multiple sensors, so that as a person moves down a slide and turns around each bend they are creating a unique movement signature. As a person moves along the slide or track, the change in that signature over a small finite time period, also known as the sampling time, is recorded, and this is the "acceleration signature."

"Trained model" is the output of a machine learning algorithm that has been trained on a set of acceleration signatures, and which can be used to make judgements or predictions about future, yet unseen, acceleration signatures as they are recorded.

"External inputs" refer to any signals or information received by the headset from an outside source.

"Train/vestibule" is a device used to give a person motion during the experience, including inflatable tubes, a wheeled carriage, a motorized device, or a cable system.

Determining the positions of individual people as they move down a track or a water slide is a complex calculation. Current virtual reality systems rely on users being in a confined environment like an 11 ft×11 ft room, or larger arena with specially designed optical or infrared sensors that track user movement. These systems are designed to track people as they walk or stand and typically do not involve high speed movements or unpredictable rates of acceleration found on waterslides or track (typically around 6 ft per second). These systems commonly use light-based sensors or imaging devices to monitor the user's movements and send that information back to a headset that is wired to a terminal. Virtual reality images are displayed at a rate of between 40 and 120 times per second to ensure a comfortable experience, and so the position must be determined by the headset at a similar rate while displaying these images. To gather this information and relay it back to the headset while the user is moving quickly is complex, and the presence of water also means that light-based solutions and other common methods have a high risk of failure, due to refraction and particulate effects in water.

Individual riders complete the track or slide at different speeds, due to variations in height, weight and friction. For virtual reality content to be comfortably displayed on a headset, the headset must be aware of where it is on the track, within a few feet, (e.g., five feet, four feet, three feet, two feet or one foot), so that the images can be synchronized to the rider's motion. A series of ultrasonic sound emitting beacons are placed along the track to instruct the headset that it has passed each beacon in succession. Sensors inside the headset are also monitoring the acceleration and velocity of the rider, performing a series of calculations that help determine where the rider is on the path.

Separately, there is a need for a headset that can display virtual objects while the user is submerged under water, allowing images to be clearly displayed without the need for a large pocket of air typically required to correctly display virtual reality content. The air pocket is needed because a distance of at least several inches is required between the lens optics and the screen or visual source. This system would allow a virtual or augmented reality system to work underwater. A mask that employs soft waterproof materials such as rubber or silicone is used to seal the area around the user's face under water and eliminate the air gap that separates the screen and the optical lenses. Upon submersion, the space between the screen and lenses is filled with water, eliminating the air gap that ordinarily separates the display from the lenses. The optical properties of water can therefore be used in conjunction with the lens elements in the mask to produce a clear image.

In some implementations of using a virtual or augmented reality headset while submerged in water, there is a need for the user to stay in a stationary position, to prevent collisions with the water's containers or other swimmers. Therefore, a tether system has been designed where the user wears a belt or harness that gives him/her buoyancy in water and restricts his/her physical movement to a small radius based on the length of the tether cord.

Modifications to this tether can be made, such as pressure or stress/tension other types of data measurement devices, to help inform the computational units that relay position and velocity to the virtual reality content processing devices. The tether can be held in place via fixed hardware connected to the boundaries of the container or via a significantly weighted unit that has the option to be moved or removed.

The methods described can be implemented in a wide variety of different types of water-based virtual reality attractions. The methods enable virtual reality experiences to work between two or more fluid mediums, such as air, water, or other gases and liquids. The methods to identify the user's location with ultrasound and inertial measurements have the ability to track across multiple mediums. Experiences above water, experiences below water, partially submerged experiences and in experiences that allow the user to move between air and water can be targeted. These types of attractions could include a person moving on water through the force of gravity, a person moving on or in water with the aid of a motorized vehicle, a person swimming in a determined area, a person swimming in a moving current of water, a person floating in a confined area and any experience where a user transitions from being above the surface to underneath the water, or stays in either one.

The method of this invention takes the user's current position, derived from the position and orientation of encoded transmissions from different external inputs. In one aspect of the present invention, external beacons are used to emit signals detected by the virtual reality headset. There are other potential ways to do this such as using OPS, "Near Field Communication" (NFC) chips, radio signals, Bluetooth signals, or infrared detection. Other methods typically, however, either have reduced accuracy, frequency or range. Use of beacons is accordingly a preferred method. Small beacons placed at intervals along the track or waterslide act as a transmitter to emit encoded high frequency signals to a receiver that is connected to the virtual reality headset. As the rider wearing the virtual reality headset passes the high-frequency signal software that uses doppler-shift based algorithms, is used to detect the exact moment that the rider is passing this sensor and informs the system that the rider has passed the sensor. This method is special in that it employs an "inside-out" technique; using the headset to gather external information, rather than using external sensors to detect a position and relay that information back to the headset.

Others have used external sensors to detect orientation and position in environments that lack the presence of water. For environments containing water, however, high efficiency is achieved by processing in an "inside-out" fashion, using signals that perform well in and around water, like sound or magnetic signals. Magnetic signals are one of the few ways to transmit information underwater (over short distances) with little to no interference from the water medium. The combination of the performance of our neural network and the analysis of the physical simulation, increases efficiency and decreases "lag" or processing time that could interfere with synchronization of the visual elements, to an order of 100 to 500 milliseconds.

In another aspect of the present invention, a plurality of internal sensors is used to detect and record the acceleration and orientation of test riders as they go down the slide or ride. Each data set for a single rider is referred to as an acceleration signature. A plurality of acceleration signatures is collected from test subjects in order to train a machine learning algorithm.

Typically, between 50 and 2000 acceleration signatures would be collected for training, although as few as 10 to 50 signatures could be collected or as many as 2000 to 10000 or more acceleration signatures could be collected.

The collected acceleration signatures are used to train a machine learning model, such regression models, random forests, and artificial neural network. Artificial neural network types that could be used include feedforward neural networks, radial basis function neural networks, Kohonen self-organizing neural networks, recurrent neural networks, convolutional neural networks, and modular neural networks which combine different types of neural networks into a single network.

A machine learning model is trained from the test acceleration signatures to output a value corresponding to the rider's location on the slide. The output value is typically a number between 0 and 1 where 0 corresponds to the beginning of the slide and 1 corresponds to the end of the slide, but any numeric range could be used. Discrete buckets or classifications could also be used, where the first classification corresponds to the first section of the slide, the second classification corresponds to the second section of the slide, and so on.

During the consumption of a virtual or augmented reality experience on the water slide, the trained neural network is used to output the rider's predicted location on the slide. This information can be actively used in conjunction with the sensors to accurately determine exactly where the rider is. Because the beacons are most effective when placed at intervals throughout the path, the sensor data allows the system to fill in the gaps left by the sensors, to create a complete model of the precise position of the rider. This complete model leaves no part of the ride unmeasured by the system. If the intervals between beacons are "blind spots," the sensor data helps create a full image in between blind spots. Our system is unique in employing the use of a software controller that takes the data from these two components (beacons and internal sensors) to calculate a highly precise position of the user at any given moment, at a high frequency.

The virtual reality headset utilizes a mobile radio device, a mobile telephone, in particular a smartphone or tablet computer to power the display and combine the necessary sensors that are used to gather movement and orientation. The present invention is also unique in that it uses only sensors already found on such devices to do all the computation, without the need for any external hardware to be attached to the virtual reality headset. These sensors include a microphone, magnetometer, accelerometer, gyroscope, barometer, pressure sensors, capacitive touch sensors, proximity sensors, Near Field Communication (NFC), RFID, Bluetooth, Wi-Fi, GSM, and optical sensors including cameras and depth scanners.

Moreover, the tracking system can currently take in two inputs (acoustic beacons and inertial measurements), and "fuse" them together, making intelligent assumptions about possible positions of the rider. For example, on a waterslide, it is nearly impossible to move backwards, and if one or more inputs are telling the fusion system that the rider is indeed moving backwards, then those inputs are discarded. A novel feature of this fusion system is that any number of inputs can be added and existing inputs can be swapped out. This allows for it to be flexible, and adapt to new technology, without having to reinvent the underlying system. For example, if better beacon sensors are devised, then those replace the acoustic beacons, and the rest of the system functions as-is.

The purpose of the tracking system is to match the user's location in physical space with their location in virtual space in order to display the correct image on the headset display corresponding to the user's current location. The image to be displayed could either be created in real time using a game engine or other graphics rendering library, or it could be loaded from the appropriate frame of a video sequence. If loaded from a video sequence, then the video would be played at varying speeds depending on how the quickly the rider was moving through physical space. For a rider who was moving more slowly, the video would be played at a correspondingly slower rate. Similarly, for a rider moving more quickly, the video would be played at a correspondingly faster rate.

FIG. 1 shows one embodiment of a water slide 4 enabled for a virtual reality experience.

The person 1 may sit on an inflatable tube 2 that is carried by a stream of water 3 down the length of the slide 4. Alternatively, the person 1 may ride down the slide 4 with no tube 2 or support. The person 1 places a virtual reality headset 5 over their eyes at the initial loading point 8 of the slide 4. Beacons 6 mounted on supports 7 line the length of the slide 4. As the virtual reality headset 5 passes each beacon 6, a proximity sensor 9 detects the person 1 passing the sensor 9. A transmission 10 is delivered from the beacon 6 to the headset 5. These transmissions 10 are the first indication to the system what percentage of the water slide 4 the person 1 has moved through.

Alternatively, the slide 4 could be a slide without the presence of the stream of water 3. The tube 2 could instead be a vestibule with wheels that allows the person 1 to travel down the slide 4. The beacons 6 could be mounted or embedded into the structure of the slide 4 itself, rather than mounted on supports 7. The beacons 6 could be a range of different items; sound emitting devices, magnetic markers, optical markers, radio frequency broadcasting devices, or sensors that detect the proximity of a person 1. In this embodiment, the proximity sensors 9 and beacons 6 work together to deliver a transmission 10, but an embodiment could be created that uses only beacons 6 to deliver the transmission 10.

Figure 2:
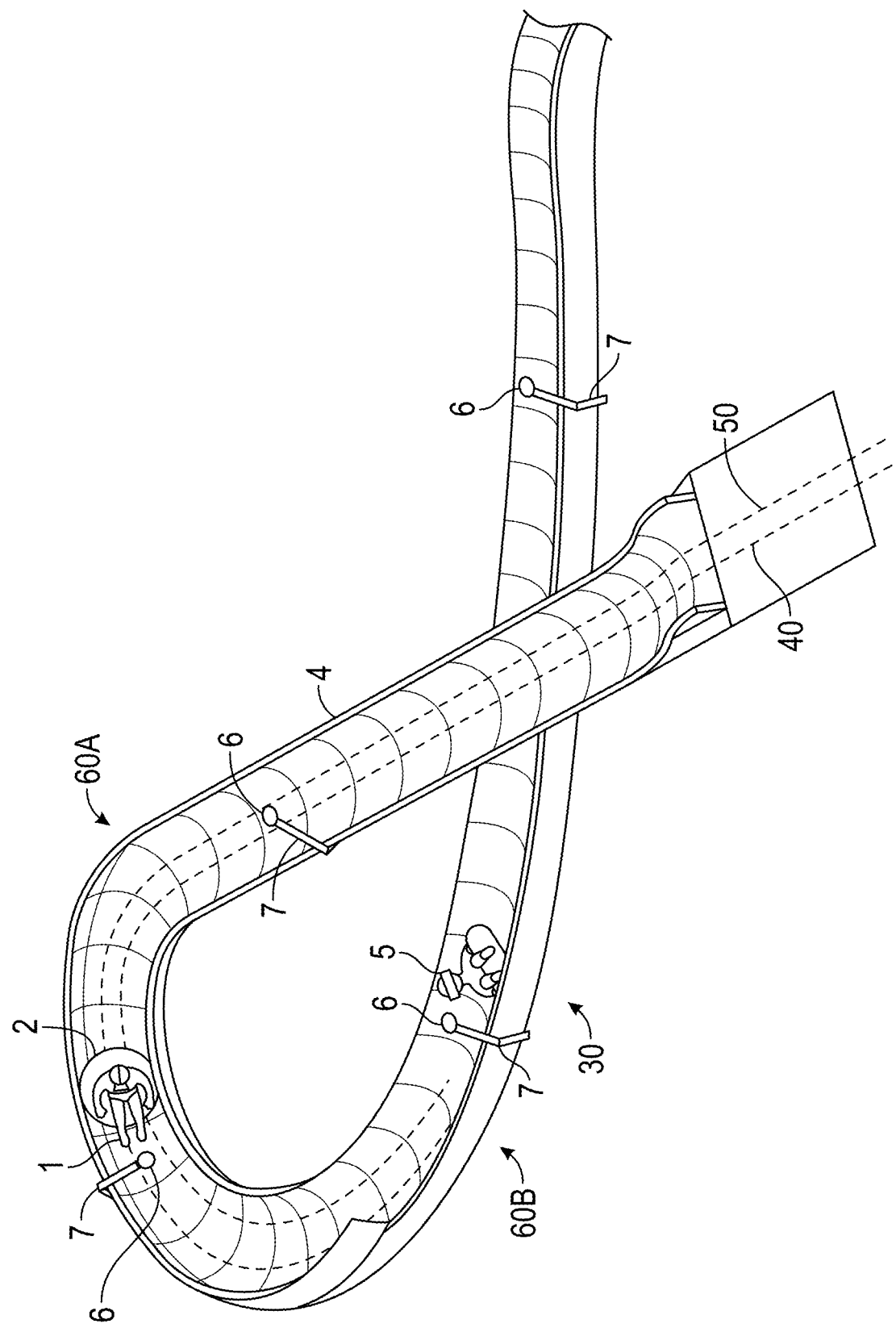
FIG. 2 is an isometric view of the water slide, showing the beacon system and various motion paths being calculated by the inertial calculation system and neural network.

FIG. 2 shows another embodiment of a water slide 4 enabled for a virtual reality experience. A person 1 sits on an inflatable tube 2 that is carried by a stream of water down the length of the slide 4. As the rider accelerates at the top of the ride 30 or enters large sections of force such as a turn in the slide 4, the processors inside the virtual reality headset 5 are analyzing the active motion path 40 (velocity and acceleration). When a person 1 enters a turn (at 60A) and then completes the turn (at 60B), this is calculated as one part of the signature of the person's active motion path 40. The active motion path 40 is then compared to the signature of previous riders' motion paths 50. The motion paths of previous riders are collected, averaged and processed by a neural network, which results in the signature of previous riders' motion paths 50. The analysis of this is the second indication to the system what percentage of the water slide 4 the person 1 has moved through. Beacons 6 mounted on supports 7 along the slide 4 assist to authenticate that the analysis of this data is correct. This data is not only useful for determining position but could be used to create a competitive element between riders, to analyze slide 4 performance and throughput, and to help inform the design and creation of future slides. It could also be used as a safety measure, to identify if people safely make it through the complete track. If the system detects that an abnormal pattern suddenly exists, a notification could alert a ride operator that an error has occurred.

In another embodiment, it is conceivable that the system involving the analysis of the active motion path 40 to previous riders' motion paths 50 could work independently, without relying on beacons 6 to authenticate the analysis.

FIG. 3 shows detail of a person 1 wearing a virtual reality headset 5. Flexible straps 122 help secure a rubber mask 53 to the person's face, which creates a complete seal that prevents water or air escaping the space between the rubber and the user's face. A smartphone or tablet 110 is placed inside protective housing 120. Lenses 125 on the inside of the mask magnify the image from the smartphone or tablet 110 to fill the person's field of vision.

Figure 4:
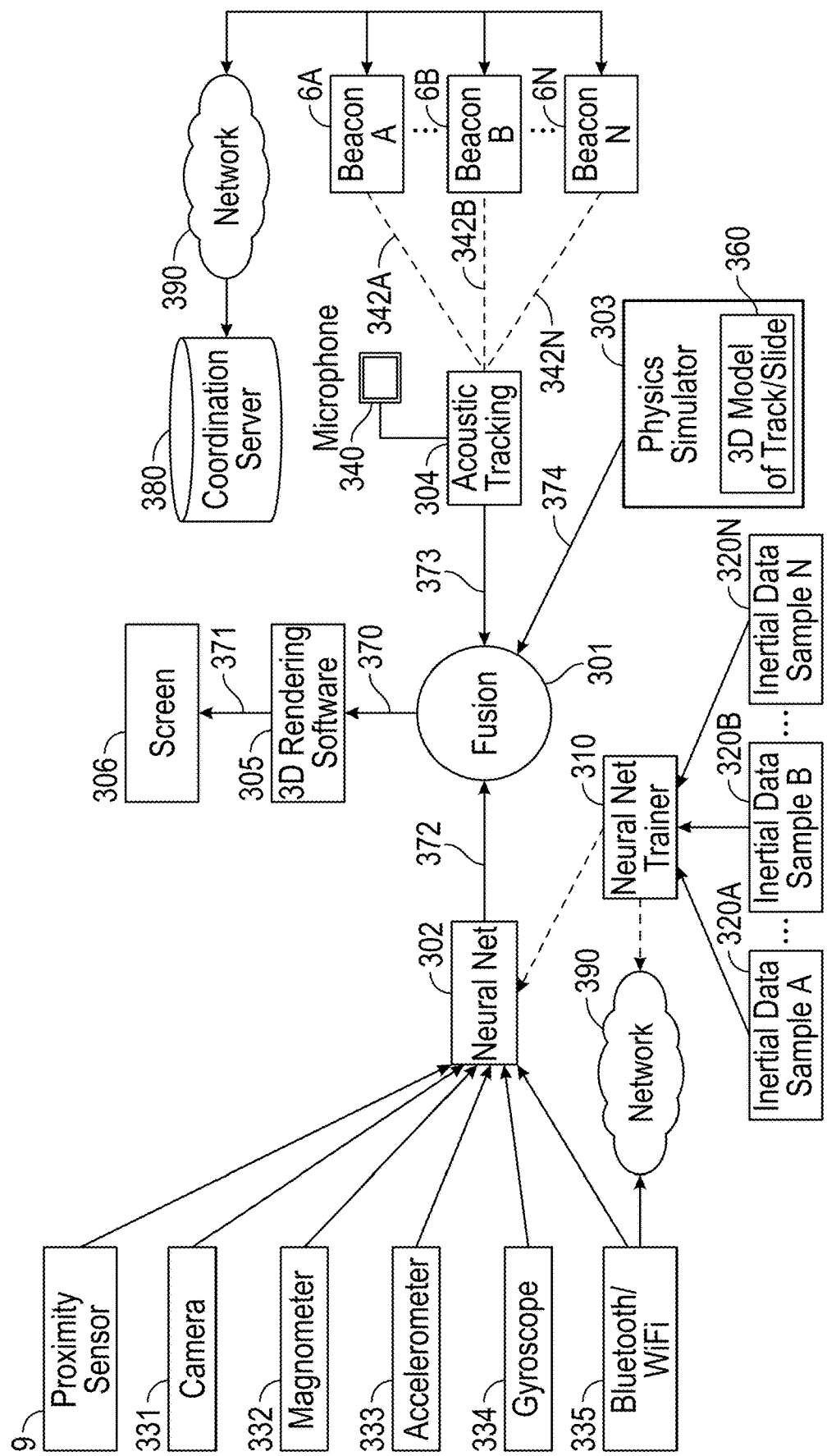
FIG. 4 shows the system diagram of a synchronization and rendering system that allows riders' physical experience to match that of what they're seeing as they go down a waterslide.

FIG. 4 shows the system diagram of a synchronization system that allows riders' physical experience to match that of what they're seeing as they go down a waterslide 4. Inertial data is collected from multiple riders, aka "signature," shown as 320A thru 320N. This is used by the Neural Network trainer 310 to create an overall representation of the signature of the slide, 302, the "Neural Network."

The "acoustic tracking" block 304 is able to interpret acoustic signals 342A through 342N from different beacons 6A through 6N as the rider goes past them to know which section of the slide or track the rider is on, and provides this value, 373, to the fusion block 301.

The "physics simulator" 303 has a general understanding of how a body would move along the slide or track at different points in time, and also has the three-dimensional (3D) model of the track 360. It is able to provide these pieces of information to the fusion block 301 as 374.

This "fusion" block is able to ingest the various inputs from the neural net 302 and the acoustic tracking 304 (position along the track, value between 0 and 1), and the physics simulator 303 (position in 3D space, but on the track as simulated), and produces a final 3D position 370. This is provided to the 3D rendering software 305, which also has a 3D map of the track 360, and using these pieces of information, the 3D rendering software 305 is able to fully create the first person position image 371 of a person moving through a virtual world. This is viewed on a virtual reality screen 306.

The neural net 302 (neural net or other machine learning algorithm) processes the input from multiple sensors, such as proximity sensor 9, camera 331, magnetometer 332, accelerometer 333, gyroscope 334, Bluetooth and Wi-Fi 335 and compares it to the overall signature of the ride (which it received from the neural net trainer 310), and is able to approximate the current position, 372.

The Bluetooth/Wi-Fi module 335 is also able to communicate directly to each beacon (6A through 6N) as well as the "co-ordination server" 380, through the network 390. The co-ordination server 380 holds overall information about the system.

Figure 5:
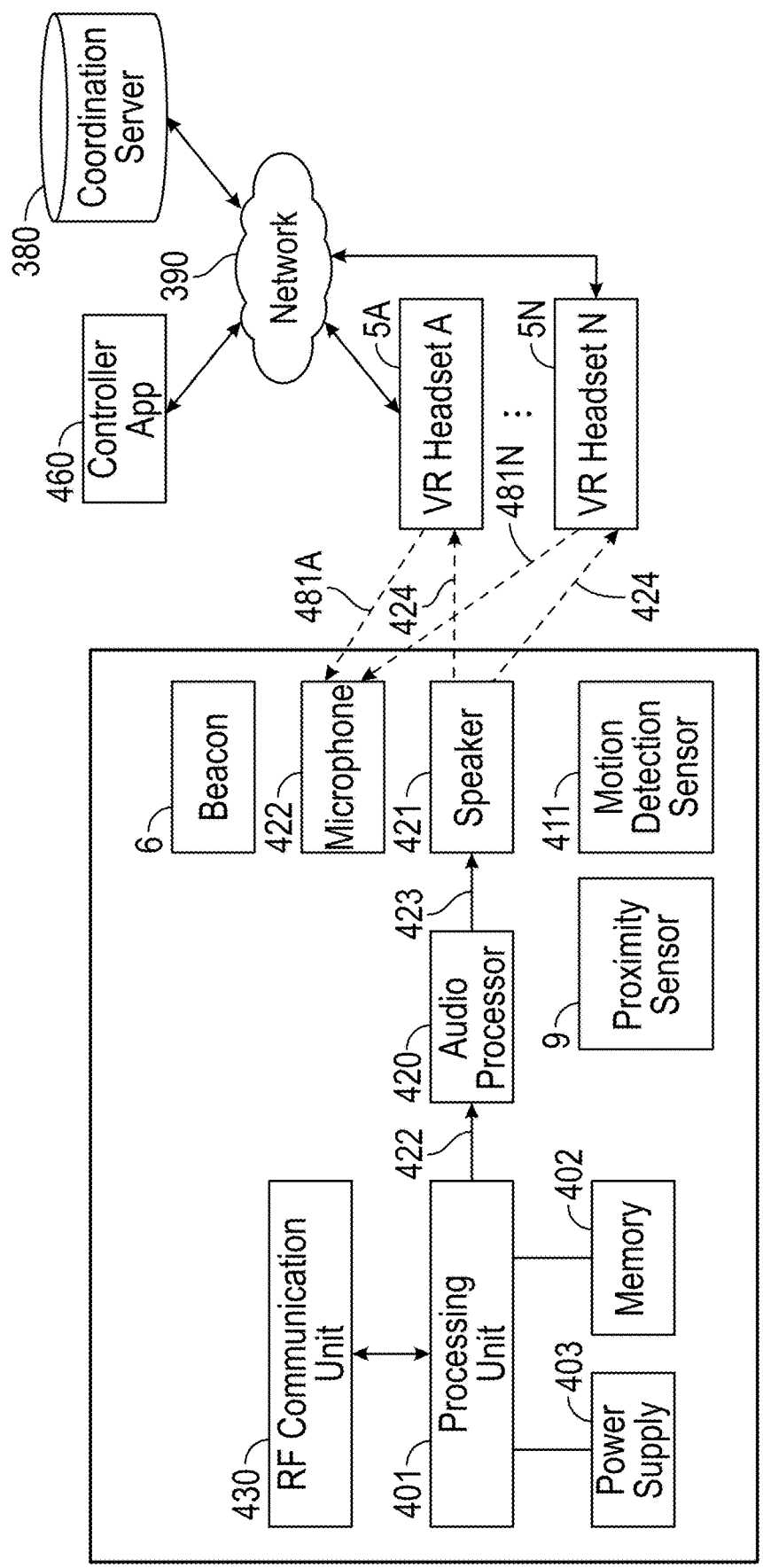
FIG. 5 shows a possible implementation of each beacon and details about the coordination server.

FIG. 5 shows a possible implementation of each beacon 6, and details about the co-ordination server (also shown in FIG. 3, as 380). In one version of the invention, multiple sensors, such as the proximity sensor 9 and motion detection sensors 411 are able to detect the presence of a rider 1 (wearing a virtual reality headset, 5A through 5N within a small area of the placement of the beacon 6. They provide this information to the processing unit 401, which then generates an appropriate ultrasonic digital signal 422 and sends it to the audio processing unit 420, which converts it into appropriate electrical signals 423 which can then be played by an acoustic speaker 421, to generate the encoded ultrasonic sound wave 424. The processing unit 401 relies on attached memory 402 and power supply 403 to function properly.

In addition, the virtual reality headsets 5A through 5N can also communicate back to the beacon 6, using encoded ultrasonic sound waves 481A through 481N.

In another version of the invention, the processing unit 401 always plays the appropriate ultrasonic signal 422, which is then converted to the correct ultrasonic sound wave 424, in the manner described above.

The RF communication unit 430 comprises of all electrical hardware required to encode and decode radio frequency waves, including protocols such as Bluetooth and Wi-Fi. This unit allows the beacon 6 to communicate with every virtual reality headset (5A through 5N), as well as the co-ordination server 380, via the network, 390. The co-ordination server 380 is able to change any functional aspects of each beacon 6. It is also able to communicate with each virtual reality headset 5A through 5N present in the system, through the network 390. The co-ordination server 380 can receive instructions to change any functional aspects, from a controller app 460, through the network 390. The co-ordination server 380 also keeps a record of all the information being transmitted throughout the system, for diagnostic purposes.

FIG. 6 shows an example "acceleration signature" of the person in the experience. Each spike in the graph represents a period of increased acceleration. The overall pattern of high and low accelerations creates a distinctive signature that can be used to identify where a person is along a slide or track. While the rider is getting positioned to begin the ride there is a large period of small movement 130, but the start of the ride is usually evident with a spike in acceleration 132. Throughout the ride, large turns are also denoted by spikes 134 on the chart. Finally, the end of the ride is typically seen as the largest spike 136, when riders hit a pool of water and their acceleration is quickly stopped. This is followed by another period of small movement 138 as the rider exits the ride.

Figure 7A:
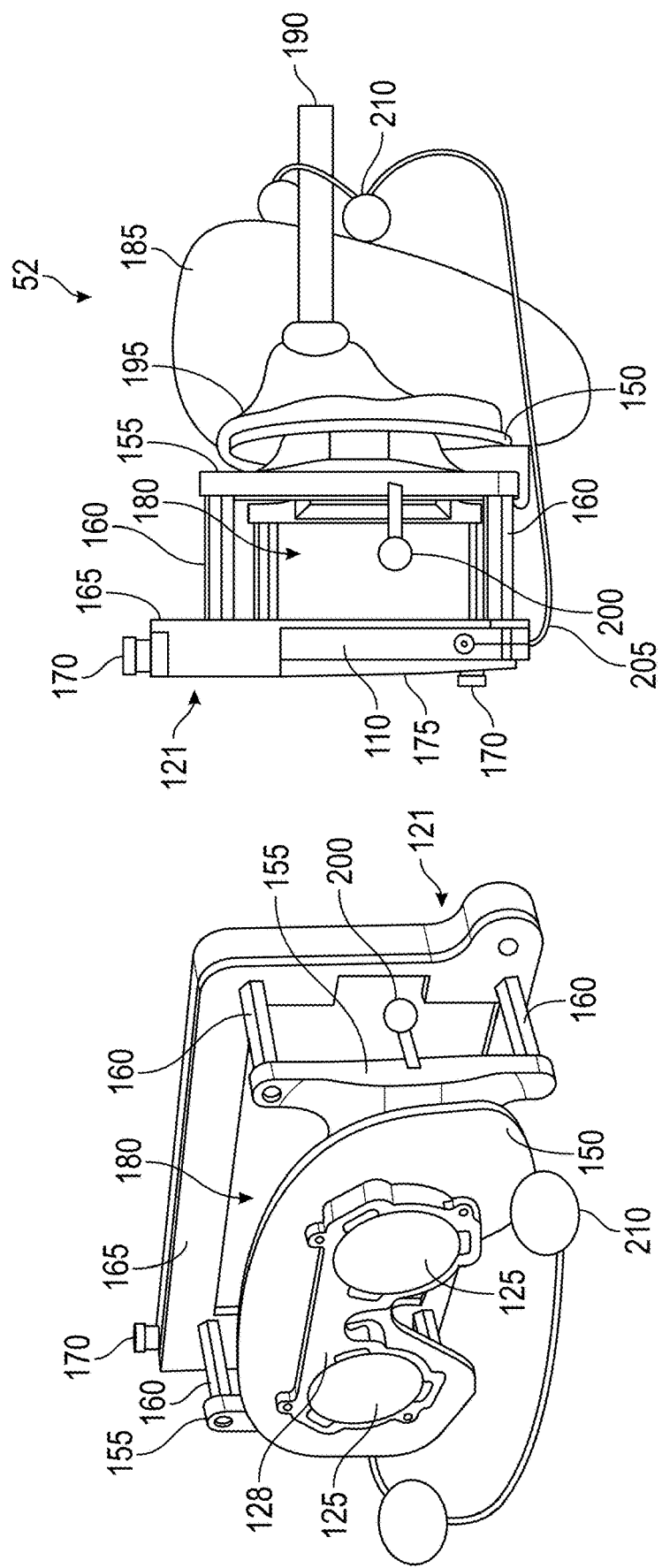
FIG. 7A is an isometric and side view of the mixed reality headset capable of displaying content underwater.

FIG. 7A is an isometric view of the viewing unit in a mask designed for viewing virtual reality content underwater. An enclosure 121 for the smart phone or tablet 110, made of a front plate 175 and a back plate 165 holds a smart phone or tablet 110. The front plate 175 and back plate 165 are held together by a screw 170, which detaches to allow the pieces to separate for inserting the smartphone or tablet 110. The enclosure 121 is positioned in front of a sheet of glass 150 found in most common diving masks. Spacers 160 are used to separate the enclosure 121 from the glass 150 at a precise distance that is measured to allow lenses 125 to correctly magnify the image with the inclusion of water, which fills the area 180 between the enclosure 121 and the glass 150. The lenses 125 are held in place by a lens plate 128 that is attached to the inside of the glass 150. Mounting brackets 155 are attached to the outside of the glass 150 to connect the spacers 160 and the enclosure 121 to the rest of the unit.

The side view of FIG. 7A shows the complete headset 5 designed for viewing virtual reality content underwater. The viewing unit is attached to a standard dive mask 52 that is comprised of lens frames 195 which hold the glass plate 150. A flexible waterproof material, commonly a rubber piece 185 seals around the user's face to prevent water from flooding their nose, eyes and face. A head strap 190 is used to fasten the entire headset 5 to the user's head. A set of bone conducting headphones 210 attached via an audio cable or Wi-Fi, Bluetooth, or other RF or acoustic transmission technologies 205 can be attached to the headset 5 in order to allow users to experience sound while wearing the headset 5 above or below the waterline, or a bone conduction transducer 200, can be attached directly to the headset 5 or mask 52 to transmit the sound vibrations to the user via the mask 52.

A key component of this invention is the empty space 180 between the glass 150 and the enclosure 121, which is designed to be flooded when submerged under water. Using the properties of water as a magnification element, water works in conjunction with the lenses 125 to create a sharp image viewed by the user.

In addition to the displaying virtual reality content, the screen, smart phone, or tablet 110 can be used to display information to the ride operator. For example, when not in use, the display could be set to a certain color to indicate the amount of charge in the battery of the device (green=full charge, yellow=medium charge, red=low charge).

Figure 7B:
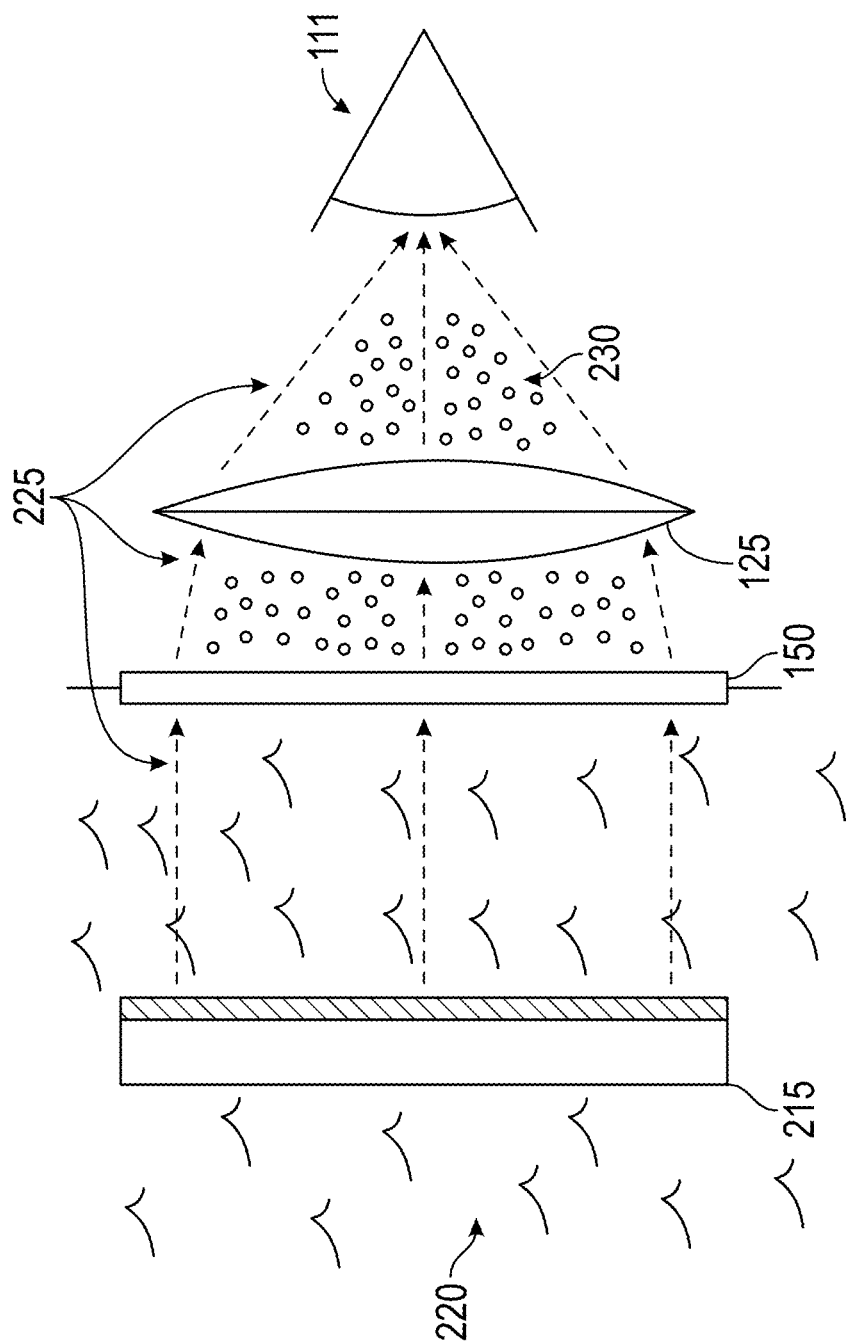
FIG. 7B is a side view diagram of the transmission of light through multiple mediums on a virtual reality headset, e.g., light passing through lenses, water, glass and air.

FIG. 7B shows a more detailed diagram of how light is transmitted from the display 215 to the user's eye. The display 215 transmits light 225 directly through water 220 through a clear barrier like plastic or glass 150 which then travels through air 230 and is refracted through a lens 125 and eventually directed into the user's eye 111. Detailed measurements of the focal distances between these mediums are listed as 8 9 and 10.

Figure 8:
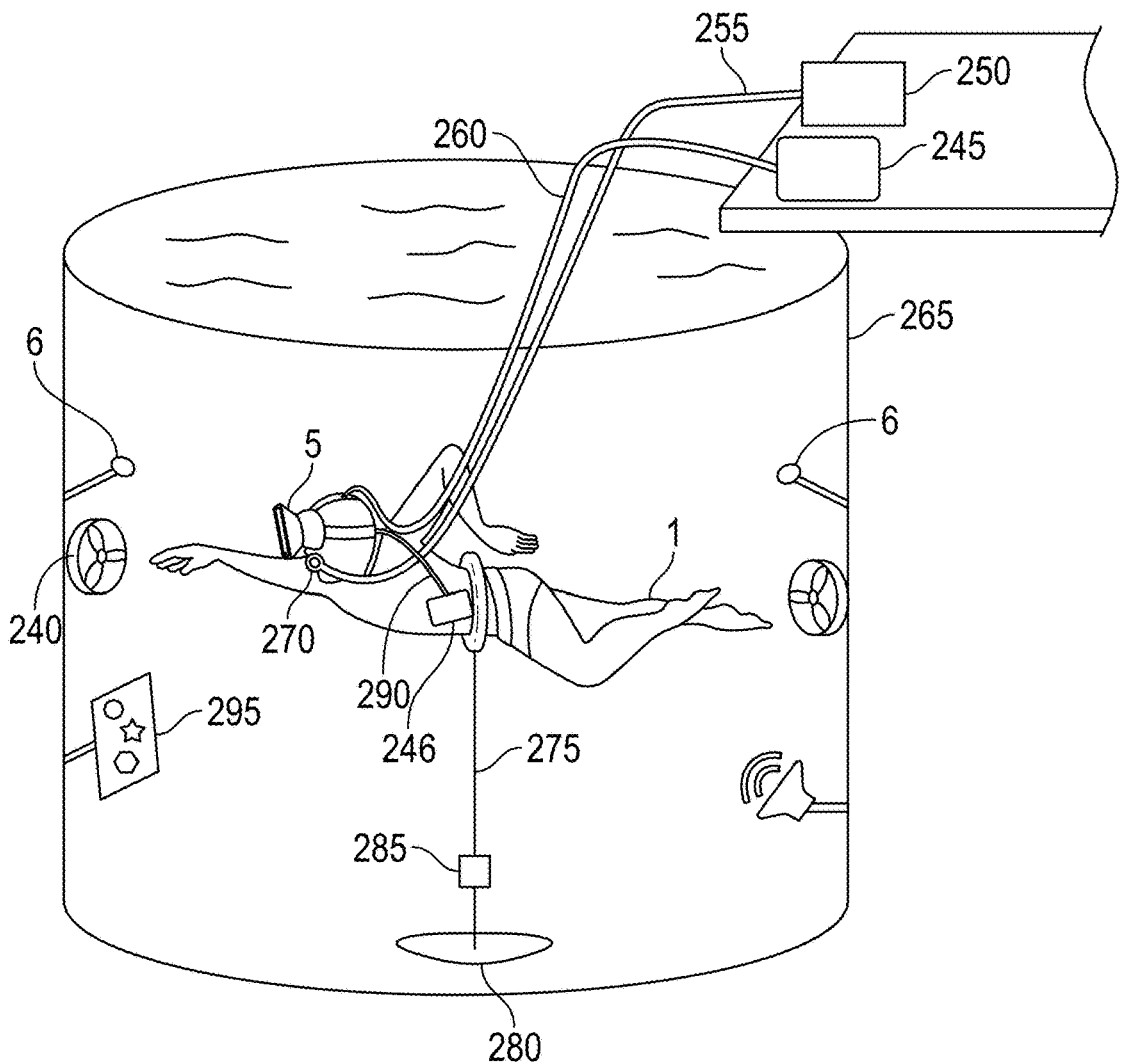
FIG. 8 is a side view of a tank-based mixed reality experience where the user is fully submerged.

FIG. 8 shows an experience where a person 1 is swimming in a confined body of water or tank 265. They are fully submerged, using a virtual reality headset 5 designed to view content underwater. Submerged beacons 6 help calculate position of the person 1 in the tank 265, so that the virtual reality content responds and changes with the person's movement. Instead of beacons 6, a plurality of visible markers 295 can be placed along the inside surface of the tank 265 which can be detected by a camera on the virtual reality headset in order to infer the position of the headset in space. Devices 240 can be used to generate a current to move water over the person 1 to aid in giving the sensation that the person 1 is moving naturally through the water and keep the person 1 centered in the tank 265. An air compressor 250 is delivering oxygen to the person 1 through a tube 255 and breathing apparatus 270. A set of wired cables 260 connects the virtual reality headset 5 and a computer terminal 245 to deliver high-powered graphics. A tether 275 from one of the tank 265's inside surfaces to the person 1 may be used in order to prevent the person 1 from coming in contact with the sides of the tank 265 while swimming. The tether 275 can be affixed to the bottom of the tank 265 or pool at an anchor point 280 using either a suction cup, adhesive, fixed object or a weight such as a sandbag. The person 1 may either be fully submerged within the water using scuba equipment or long breathing tube for air supply, or the person 1 may float at the surface of the pool while breathing through a snorkel. A sensor 285 can be used to monitor direction and force on the tether 275, which is translated by a computing device 246 and relayed to the headset 5 via a special connection cable or transmitter 290.

A combination of the devices shown in FIG. 8 can be used in various ways. The virtual reality headset 5 can be used without the set of wired cables 260 or computer terminal 245. The tank 265 can be an ordinary pool or container of water. The beacons 6 can produce multiple types of transmissions including ultrasonic, magnetic, light, and various types of radio frequencies. The user can swim freely without restraints or use a tether 275 to hold them in place. The tether 275 may have sensors that feed data back into the mixed reality headset 5.

Figure 9:
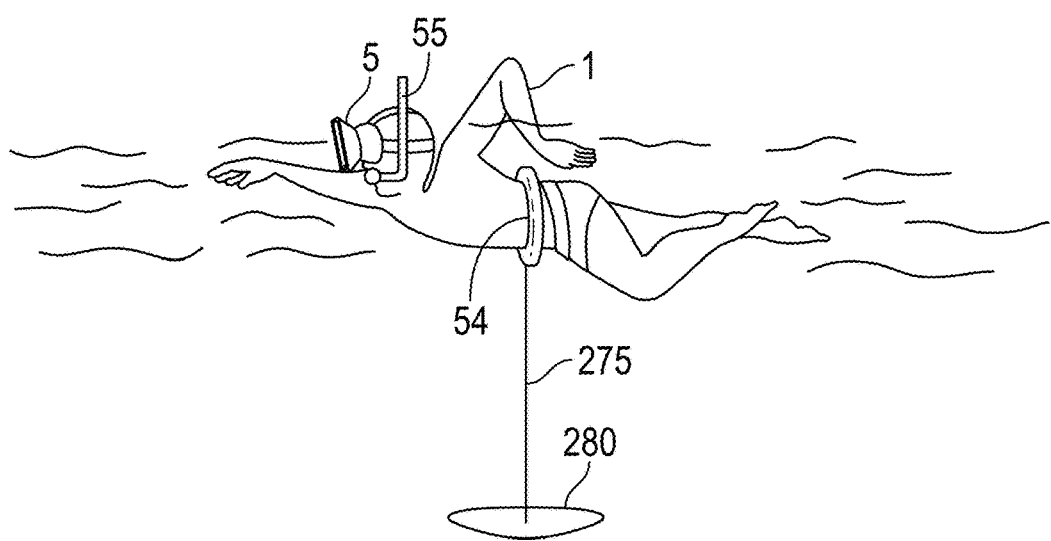
FIG. 9 is a side view of a snorkel-based mixed reality experience where the user is buoyant at the surface of the water

FIG. 9 shows an experience where a person 1 is swimming at the surface of water with a mixed reality headset 5 and a snorkel 55. Their buoyancy is aided by a flotation belt 5, which is connected to a "tether" 275 that is secured to a suction cup, adhesive, fixed object or a weight such as a sandbag or anchor 280. The tether 275 inhibits the movement of the swimmer and keeps them within a certain radius of the anchor 280. The length of the tether 275 allows the user to stay above the surface of the water, while giving them a certain radius of movement. This radius can range from 4 ft to the maximum size of the pool, although typically 6-8 feet is enough. The tether 275 also acts as a safety device, which prevents the users from colliding with the sides of the pool and other pool users. The length of the tether 275 can be adjusted to according to the depth of the water body, e.g., if the depth of the water body is 4 feet, and the desired radius of the range of movement is 3 feet, then providing a tether 275 length of 5 feet will allow this.

Figure 10:
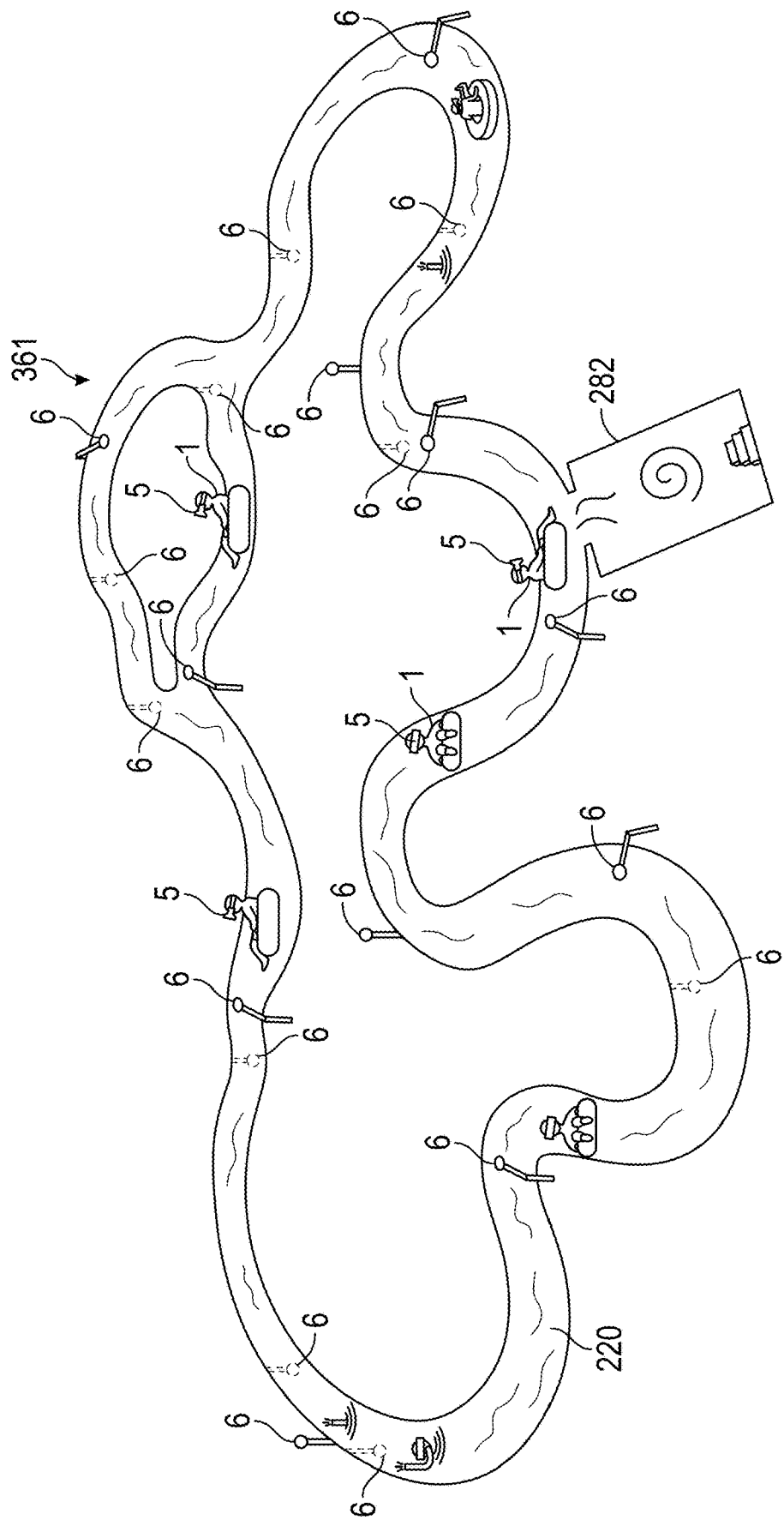
FIG. 10 is an isometric view of a lazy river mixed reality experience that incorporates ultrasonic tracking technology.

FIG. 10 shows an isometric view of a virtual reality attraction that utilizes a moving current in a circular track or flume 361. The central entrance and exit 282 allows riders to embark and disembark. Beacons 6 are placed above the water 220 line of the track or flume in addition to beacons placed below the surface of the water 220. Both types of beacons 6 are used depending on if the experience is meant to support people moving above the water 220 or submerged below the water 220.

Riders can ride in a tube or a boat that keep them above water 220 or riders can be submerged below water 220, using a snorkel or breathing apparatus to experience virtual reality content below water. The track 361 completes a circular path and disembarks riders where they entered the ride (at central entrance and exit 282).

FIG. 11 shows a launching pad 213 which can be used to interact with the software running on the virtual reality headset 5 without requiring the use of buttons or access to the capacitive display. An RFID or NFC card 229 is concealed within the launching pad 213 that is detected by the headset 5 when the headset 5 is held close to the launching pad 213. By holding the headset 5 close to the launching pad 213 a variety of software actions can be initiated, including launching an application on the headset 5 such as a virtual reality experience, or terminating an application or virtual reality experience. Virtual reality experiences must be correctly oriented in space, particularly when providing virtual reality experiences along fixed paths such as water slides 4.

This way when the user moves physically in a particular direction, such as north, they can move in that same direction in virtual space. By mounting the launching pad 213 along a specific direction 221, the virtual reality headset 5 can have its orientation calibrated each time it is held against the launching pad 213.

Figure 12:
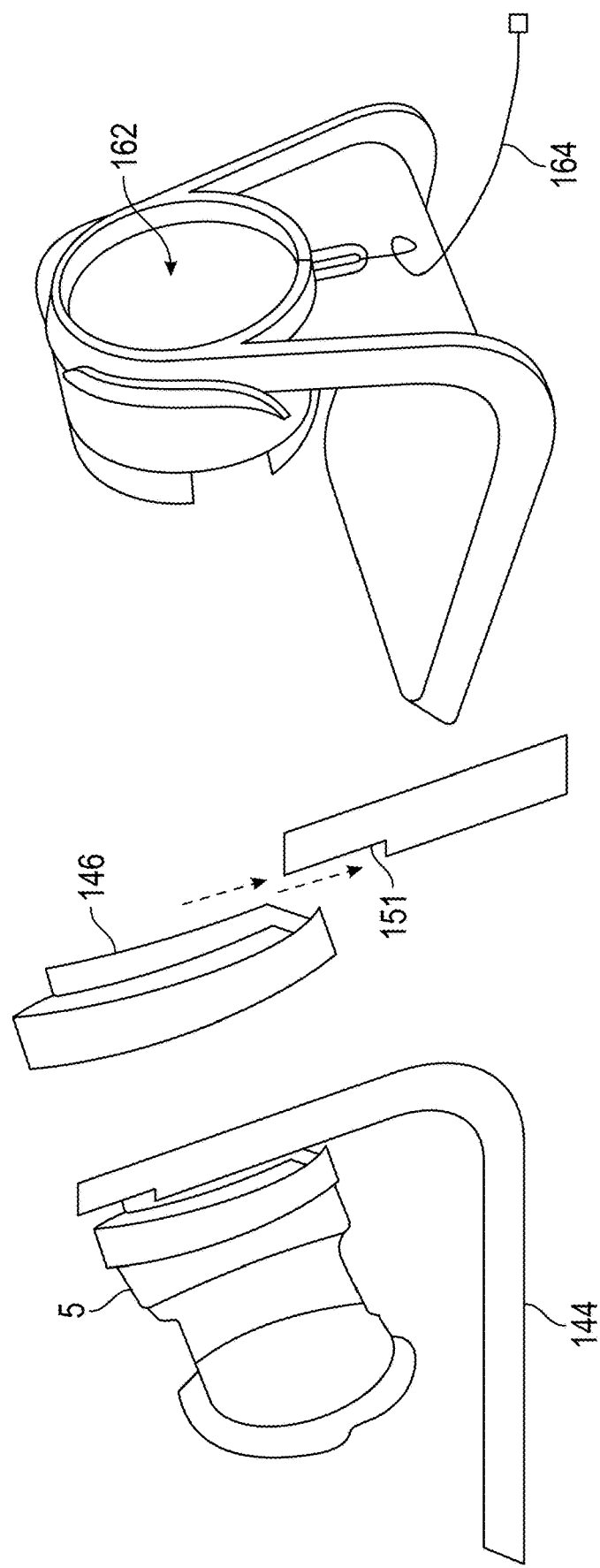
FIG. 12 is a side, detailed and isometric view of a mixed reality headset docking with a wireless charging unit.

FIG. 12 shows a charging solution for a virtual reality headset 5. Because virtual reality headsets 5 used in aquatic environments tend to get wet, charging the headset 5 through power cables poses a risk of short circuiting the device. The virtual reality headset 5 can be attached to or plugged into charging station 144 using non-conductive parts. Physical features 146 on the headset 5 can slide into matching gaps 151 on the charging station 144 in a lock-and-key manner. A wireless charging pad 162 that is affixed to the charging pad can then wirelessly transmit energy to the smartphone or tablet 110 within the virtual reality headset 5. The charging pad has a power cable 164 that is plugged into a power source.

Figure 13:
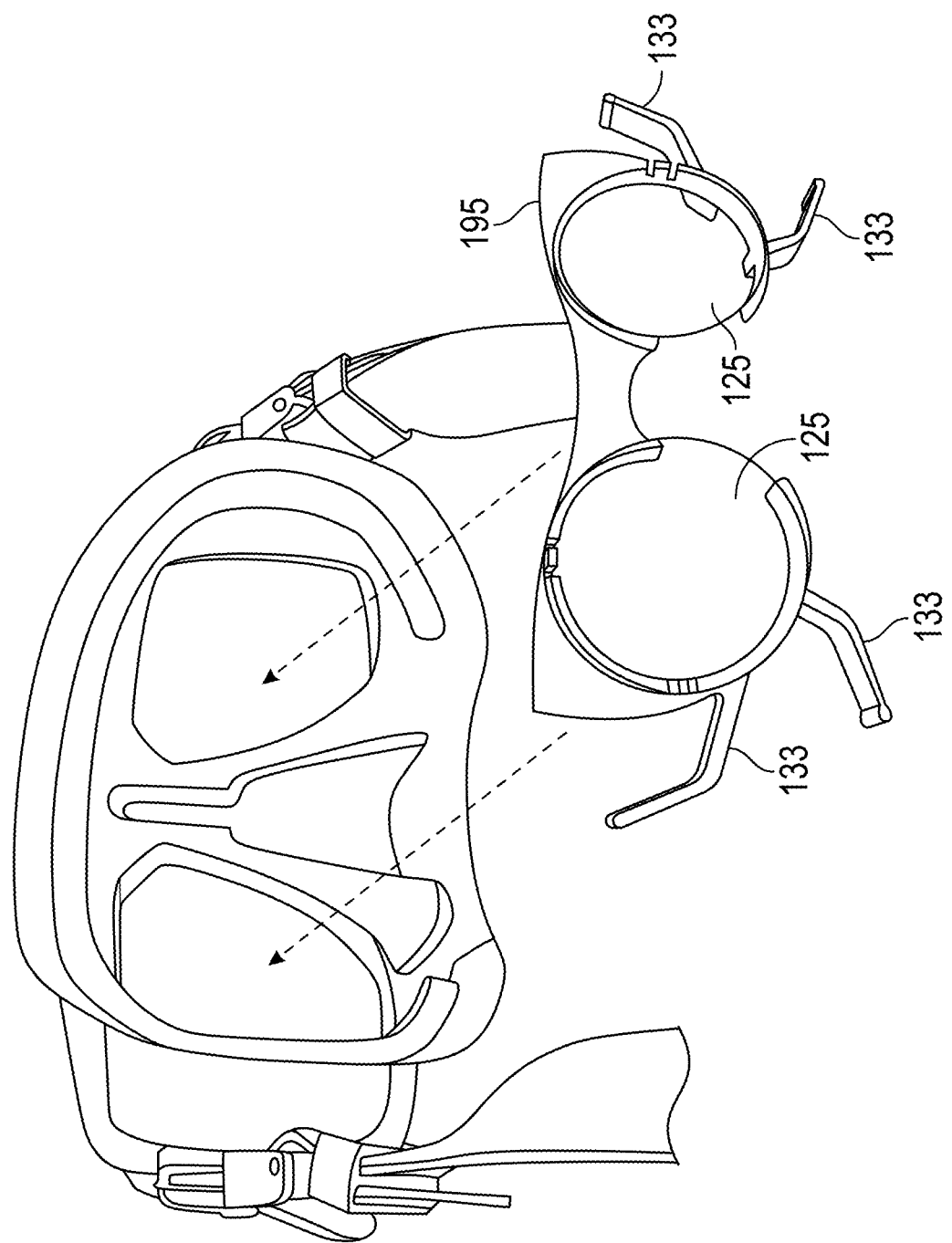
FIG. 13 is an isometric view of a unique virtual reality lens frame and dive mask headset.

FIG. 13 shows a solution for installing and removing virtual reality lenses 125 from headsets 5 that are specifically designed to be used in water. Using a lens frame 195 that supports two lenses 125 that are ideal for magnifying the virtual reality display screen in conjunction with water, the lens frame 195 is able to use tension winglets 133 that push against the sides of the mask 52 or headset 5. This allows for easy switching between lenses 125 of various inter-pupillary distances (IPD) and sizes, to accommodate a range of head shapes and users with different IPD's. Furthermore, this ventilated design allows air to circulate between the lens 125 and the glass, preventing condensation from getting trapped on the surfaces between the lens 125 and the glass.

There are many types of waterslides and water rides that are a good fit for virtual or augmented reality conversion. This encompasses but is not limited to body slides, inline tube slides, aqua loops, bowl slides, family raft slides, funnels, half pipes, multi-lane racers, speed slides and water coasters. Specifically, the AquaLoop is a slide designed by WhiteWaterWest that loads a single rider into a launch chamber where they stand with their hands across their chest. After a countdown, a trapdoor opens and the rider immediately drops 16 meters (52 ft) inside a near vertical slide. The rider accelerates to 60 kilometers per hour (37 mph) in just 2 seconds before entering the loop element. This element is a variation of the traditional vertical loop because it lies on an angle of approximately 45°. This variation of a loop is called an inclined loop. The 88.4-metre (290 ft) slide is over within 7 seconds. The experience could greatly benefit from the addition of visuals that heighten the moment of the drop and add to an otherwise short experience.

A different example is the Grizzly River Run at Disney California Adventure, a flume-style river rapids ride that is designed to hold 8 people in a single boat. By equipping passengers with waterproof headsets and installing beacons along the rapids track, we can send signals individually to each virtually reality headset and deliver an independent experience to all eight passengers in the boat.

VR experiences are commonly measured on a 5-star scale that rates entertainment value and comfort level. Entertainment value can often represent how closely the virtual experience mimics real life, or the visual quality and storytelling in the experience. Comfort level is determined by the amount of camera movement, player motion, or disorienting content and effects. Experiences can be rated as "Comfortable," "Moderate," "Intense," or "Unrated." Good experiences are less likely to make users dizzy, nauseous or scared.

In certain cases, the VR experiences provided by the present invention have an average rank of 4 or better on a 5-point scale; in others, the VR experiences have an average rank of 4.5 or better on a 5-point scale.

The implementation of this technology on waterslides creates a compelling product for theme park operators. With this technology, they can leverage existing slides that have lost appeal because they are old or outdated and create an entirely new ride experience. In certain cases, implementation of this technology can increase waterslide use (number of people riding water slide per unit of time such as a week, month or year) by at least 10 percent, 20 percent, 30 percent, 40 percent or 50 percent. In other cases, implementation can increase use by at least 75 percent, 100 percent, 150 percent or 200 percent.

Moreover, a slide or moving water body, like a lazy river, of almost any length can be converted into a virtual reality attraction. A slide of at least 30 feet long, typically up to 300 feet, 30 to 400 feet, 30 to 500 feet, 30 to 600 feet, 30 to 700 feet, 30 to 800 feet, 30 to 900 feet, 30 to 1000 feet, 30 to 1100 feet, 30 to 1200 feet, 30 to 1300 feet, 30 to 1400 feet, 30 to 1500 feet, 30 to 1600 feet, 30 to 1600 feet, 30 to 1700 feet, 30 to 1800 feet, 30 to 1900 feet, and typically up to a mile long.

In addition, the visual content experienced in virtual reality can be changed on demand. Because many people still have not experienced virtual reality, installing this new technology on a slide is beneficial as a marketing device to get people to visit the park. Parks can charge an additional fee for guests to access the virtual reality headsets. This can, for instance, increase ride/slide revenue (gross revenue received by park for ride per unit time such as a week, month or year) by at least 10 percent, 20 percent, 30 percent, 40 percent or 50 percent. In other cases, ride/slide revenue can be increased by at least 75 percent, 100 percent, 150 percent or 200 percent. The slide can also be run like a regular slide without virtual reality.

By changing the experience inside the headset, park operators can keep guests coming back to experience new types of content. One business model involves charging parks exclusively for new content, on demand or on a recurring basis. New content can be released on a seasonal basis, or for special holidays, or with advertising partners that would like to integrate their brand into the experience.

The following are examples of aspects of the present invention:

In aspect one of the present invention, a method of providing a virtual/mixed reality experience to a rider on a slide is provided. The method involves the steps of: providing a headset to a rider, wherein the headset is placed over the rider's eyes; providing a chute or channel down which the rider can slide; collecting data on the rider through interaction of the headset with beacons placed at intervals along the slide; using the data to calculate one or more values that are used to coordinate virtual/mixed reality content with the rider's position along the slide; presenting the virtual/mixed reality content to the rider through the headset thereby providing a virtual/mixed reality experience to the rider on the slide.

In aspect two of the present invention, a method of increasing use of a slide by riders is provided. The method involves the steps of: providing a headset to the rider, wherein the headset is placed over the rider's eyes; providing a chute or channel down which the rider can slide; collecting data on the rider through interaction of the headset with beacons placed at intervals along the slide; using data to calculate one or more values that are used to coordinate virtual/mixed reality content with the rider's position along the slide; presenting the virtual/mixed reality content to the rider through the headset; adding a competitive scoring system by rewarding points in virtual/mixed reality; collecting and analyzing information related to the quality of the rider's virtual/mixed reality experience to provide marketing output; increasing safety on the slide by analyzing rider data patterns and throughput; publishing the marketing output thereby increasing the use of a slide by riders; generating revenue from the slide in a way that was previously not possible.

In aspect three of the present invention, a method of providing a virtual/mixed reality experience within a body of water, such as a tank or swimming pool, is provided. The method involves the steps of: providing a headset to the user, wherein the headset is placed over the user's eyes, and the headset creates a watertight seal around the face, to prevent water from entering the area where the eyes are exposed to the optical system; the optical system uses air, light, water and a lens to generate a clear magnified image from a display to the user's eye; optionally attaching the user to a tether that prevents the user from coming in contact with the sides of the pool or tank while swimming; optionally providing the user with a snorkel allowing the user to breathe easily while floating along the water surface; optionally providing the user with scuba equipment or a long breathing tube allowing the user to breathe while becoming fully submerged in the water.

In aspect four of the present invention, a method for launching applications on the virtual/mixed reality headset and for recalibrating the headset's forward direction is provided. The method involves the steps of: providing a launching pad that contains an NFC or RFID card; holding the virtual/mixed reality headset against the launching pad so that an NFC or RFID reader within the headset detects the presence of the NFC or RFID card within the launching pad; using software to launch the necessary application or experience upon detection of the NFC or RFID card; and making note of the headset's current orientation in space for the purpose of calibrating the forward direction.

In aspect five of the present invention, a method for eliminating motion sickness experienced using Virtual/Mixed Reality is provided. The method involves the steps of: providing a headset to the user, wherein the headset is placed over the user's eyes, and the headset creates a watertight seal around the face to prevent water from entering the area where the eyes are exposed to the optical system; allowing a user to be submerged in a body of water such as a tank or swimming pool; suggesting physical movement in the virtual/mixed reality application, wherein the movement would typically disrupt the user's vestibular system out of water; allowing the user to move within the water, which results in no feeling of motion sickness.

In aspect six of the present invention, a method of providing a virtual/mixed reality experience to a rider moving along the surface of water, such as on a slide, is provided. The method involves: providing a headset to a rider, wherein the headset is placed over the rider's eyes; providing a surface of water along which the rider can travel, such as a chute or channel down which the rider can slide; collecting data on the rider's acceleration, velocity or orientation through interaction of the headset with signals generated next to the surface of the water along which the rider travels, such as beacons placed along a slide; using the data to calculate one or more values that are used to coordinate virtual/mixed reality content with the rider's position along the slide; presenting the virtual/mixed reality content to the rider through the headset, thereby providing a virtual/mixed reality experience to the rider.

Regarding aspect six: The headset is typically the headset discussed in connection with aspect seven of the present invention (below). The surface of water traveled along by a user is typically provided by a water slide or water chute. Data is typically collected through the interaction of external beacons and the headset. The beacons emit encoded high frequency signals that are captured by a receiver attached to the headset. As the rider passes the beacons, algorithms are used to accurately detect the moment the rider is passing the sensor. In certain cases, a plurality of internal sensors is used to detect and record the acceleration and orientation of riders. Collected data is used to obtain acceleration signatures for the riders. The acceleration signals are usually used to train a machine learning model to provide an output related to the rider's location on the water surface (e.g., slide). The YR/Mixed reality experiences presented by aspect six of the present invention furthermore typically provide a comfort level having an average rank of 4 or better on a 5-point scale.

In aspect seven of the present invention, a headset for providing virtual/mixed reality content to a user is provided. The headset has a viewing unit attached to a dive mask. The dive mask includes lenses and lens frames that hold a glass plate. A flexible waterproof material seals the mask around the user's face. The viewing unit includes a smartphone or tablet place inside a protective housing/enclosure. There is an empty space between glass plate of the mask and the protective housing/enclosure. When the headset is submerged under water, the empty space floods with water, and the combination of headset lenses and the water that has flooded the empty space coordinate to provide sharper images for the user. The focal distance of the lenses used can range from 36 mm, 38 mm, 40 mm, 42 mm, 44 mm, 46 mm, 48 mm, 50 mm, 52 mm, 54 mm, 56 mm, 58 mm, 60 mm, 62 mm, 64 mm, 66 mm, 68 mm and up to 70 mm. The distance from the lens to the user's eye can range from 20 mm, 25 mm, 30 mm, 35 mm, 40 mm, 45 mm, 50 mm. The space between the glass and the lens must be at least 1 mm. The combined distance from the display to the glass and the glass to the lens depends on the focal distance of the lens used. Using a 40 mm lens, the combined distance can range from 38 to 45 mm. Using a 50 mm lens, the combined distance can range from 40 to 65 mm, and so on. A head strap is used to fasten the headset to a user's head.

In aspect eight of the present invention, a method of increasing the use of existing water rides is provided. The method involves the fitting of existing water rides with technology such that they can support the virtual/mixed reality experience of aspect six of the present invention. Oftentimes, implementation of the method on existing water rides will increase the use of that ride by at least 10 percent, 20 percent, 30 percent, 40 percent or 50 percent. In other cases, implementation can increase use by at least 75 percent, 100 percent, 150 percent or 200 percent.

In aspect nine of the present invention, a method of increasing the use of existing water rides is provided. The method involves the fitting of existing water rides with technology such that they can support the virtual/mixed reality experience of aspect six of the present invention. The length of such a ride is typically at least 30 feet long. In certain cases, the length is up to 300 feet, 30 to 400 feet, 30 to 500 feet, 30 to 600 feet, 30 to 700 feet, 30 to 800 feet, 30 to 900 feet, 30 to 1000 feet, 30 to 1100 feet, 30 to 1200 feet, 30 to 1300 feet, 30 to 1400 feet, 30 to 1500 feet, 30 to 1600 feet, 30 to 1600 feet, 30 to 1700 feet, 30 to 1800 feet, 30 to 1900 feet, and sometimes up to a mile long.

In aspect ten of the present invention, a method of increasing revenue for existing water rides is provided. The method involves the fitting of existing water rides with technology such that they can support the virtual/mixed reality experience of aspect six of the present invention. This can, for instance, increase water ride/slide revenue (gross revenue received by park for ride per unit time such as a week, month or year) by at least 10 percent, 20 percent, 30 percent, 40 percent or 50 percent. In other cases, ride/slide revenue can be increased by at least 75 percent, 100 percent, 150 percent or 200 percent.

In aspect eleven of the present invention, a method of business is provided. The method involves implementation of aspect six of the present invention. Parks/ride owners would be charged exclusively for new content, on demand or on a recurring basis. New Virtual/Mixed reality content can be released on a seasonal basis, or for special holidays, or with advertising partners that would like to integrate their brand into the experience.

In aspect twelve of the present invention, a method of competition is provided. The method involves implementation of aspect six of the present invention. Using aspect six, the slide performance and throughput of each rider is analyzed, and each rider can compare his/her performance with that of others. This competition can also increase water ride/slide revenue (gross revenue received by park for ride per unit time such as a week, month or year) by at least 10 percent, 20 percent, 30 percent, 40 percent or 50 percent. In other cases, ride/slide revenue can be increased by at least 75 percent, 100 percent, 150 percent or 200 percent.

In aspect thirteen of the present invention, a method of improving safety on a water ride is provided. The method involves implementation of aspect six of the present invention. If an abnormal rider pattern suddenly exists, a notification could alert a ride operator that an error has occurred. Furthermore, whether a rider makes it safely through the complete track can be determined. Moreover, the view of the user can be switched to the view of the real world using the built-in forward-facing camera, which gives the user an immediate sense of the physical environment.

In aspect fourteen of the present invention, a method of effective transmission of image-synchronized sound is provided. The method involves implementation of aspect seven of present invention. With the use of bone conduction headphones, the device is able to transmit the sound directly into the user without having to use water as the sound transmission medium, which would distort and absorb sound, unlike air. Moreover, bone-conduction transducers attached to the dive mask itself would transmit the sound vibrations to the user, via the mask. This allows the transmission of both low, medium and high frequencies of the human hearing range to be transmitted to the user, without distortion and absorption effects of using water as the transmission medium.

In aspect fifteen of the present invention, a method of providing a virtual/mixed reality experience to a person in a confined body of water is provided. The method involves: providing a headset to the person, wherein the headset is placed over the person's eyes; providing a confined body of water, such as a tank or pool, wherein beacons or markers are placed with respect to the confined body of water (e.g., inside of tank) such that signals can be sent from the beacons or markers to a receiver on the headset; collecting data based on the interaction between the beacons or markers and the headset, wherein the data is used to coordinate virtual/mixed content with the person's position within the confined body of water, thereby providing a virtual/mixed reality experience to the person.

Regarding aspect fifteen: The confined body of water can be equipped with a device to generate a current to move water over the person to aid in giving the sensation that the person is moving naturally through the water and keep the person centered in the tank. An air compressor can deliver oxygen to the person through a tube and breathing apparatus. A set of wired cables can connect the virtual/mixed reality headset and a computer terminal to deliver high-powered graphics. A tether from one of the confined body of water's inside surfaces to the person may be used in order to prevent the person from coming in contact with the sides of the tank while swimming. The tether can be affixed to the bottom of the tank or pool at an anchor point using either a suction cup, adhesive, fixed object or a weight such as a sandbag. The person may either be fully submerged within the water using scuba equipment or long breathing tube for air supply, or the person may float at the surface of the pool while breathing through a snorkel. A sensor can be used to monitor direction and force on the tether which is translated by a computing device and relayed to the headset via a special connection cable or transmitter.

In aspect sixteen of the present invention, a method of providing revenue to entities that control or own bodies of water (e.g., pools at hotels) is provided. The method involves implementation of aspect fourteen of the present invention relative to the bodies of water.

In aspect seventeen of the present invention, a method of reducing motion sickness in a person participating in a virtual/mixed reality experience is provided. The method involves implementation of aspect fourteen of the present invention. Using aspect fourteen of the present invention, motion sickness can be reduced (25% to 40% of consumers report experiencing motion sickness while participating in a virtual/mixed reality experience) at least 5 percent relative to a person participating in the same virtual/mixed reality experience out of water. In certain cases, motion sickness can be reduced at least 10 percent, at least 15 percent, at least 20 percent, at least 25 percent, at least 30 percent, at least 35 percent, at least 40 percent, at least 45 percent or at least 50 percent.

We claim:

1. A system for providing a virtual reality or mixed reality experience to a rider of a waterslide, the system comprising:
   a plurality of beacons or markers disposed along the waterslide;
   a waterproof virtual reality (VR) headset for presenting virtual reality or mixed reality content to a person wearing the waterproof VR headset and riding the waterslide; and
   a processor configured to estimate a location of the person along the waterslide based at least in part on at least one acceleration signature, the at least one acceleration signature comprising a plurality of pre-recorded samples representing at least one movement pattern of at least one previous rider of the waterslide, the plurality of pre-recorded samples having been detected while the at least one previous rider of the waterslide previously rode the waterslide,
   wherein each of the plurality of beacons or markers is configured to be detectable to facilitate coordinated presentation of the virtual reality or mixed reality content to the person wearing the waterproof VR headset and riding the waterslide based at least in part on the location of the person along the waterslide.

2. The system recited in claim 1, wherein at least one of the plurality of beacons or markers is configured to emit a signal.

3. The system recited in claim 2, wherein the signal is an ultrasonic signal or a radio-frequency signal.

4. The system recited in claim 1, wherein at least one of the plurality of beacons or markers comprises a magnetic or optical marker.

5. The system recited in claim 1, wherein the processor is further configured to estimate the location of the person along the waterslide based in part on a Doppler shift.

6. The system recited in claim 1, wherein at least one of the plurality of beacons or markers is configured to emit signals detectable by a sensor in the waterproof VR headset.

7. The system recited in claim 1, wherein the virtual reality or mixed reality content is selectable.

8. The system recited in claim 1, wherein at least an aspect of the virtual reality or mixed reality content accounts for an orientation of the waterproof VR headset.

9. The system recited in claim 1, further comprising a launching pad configured to initiate or stop the presentation of the virtual reality or mixed reality content.

10. The system recited in claim 9, wherein the launching pad is further configured to assist in calibrating an orientation of the waterproof VR headset.

11. The system recited in claim 1, further comprising a launching pad configured to provide information to a component of the waterproof VR headset to control at least an aspect of the presentation of the virtual reality or mixed reality content.

12. The system recited in claim 11, wherein the launching pad is further configured to assist in calibrating an orientation of the waterproof VR headset.

13. The system recited in claim 1, further comprising a launching pad configured to control an aspect of the presentation of the virtual reality or mixed reality content.

14. The system recited in claim 1, wherein the waterproof VR headset comprises an enclosure configured to hold a mobile device.

15. The system recited in claim 14, further comprising the mobile device.

16. The system recited in claim 15, wherein the mobile device is configured to provide an indication of a battery status.

17. The system recited in claim 15, wherein the mobile device is configured to display a color indicative of a battery status.

18. The system recited in claim 15, wherein the mobile device comprises at least one sensor for detecting at least a subset of the plurality of beacons or markers.

19. The system recited in claim 1, further comprising the waterslide.

20. The system recited in claim 19, wherein a portion of the waterslide comprises a horizontal or uphill section.

21. The system recited in claim 19, wherein the waterslide is a body slide, an inline tube slide, an aqua loop, a bowl slide, a funnel, or a half pipe.

22. The system recited in claim 19, wherein the waterslide comprises a loop.

23. The system recited in claim 1, wherein the processor is further configured to coordinate the presentation of the virtual reality or mixed reality content to the person wearing the waterproof VR headset and riding the waterslide based at least in part on a three-dimensional model of the waterslide.

* * * * *